Dec. 12, 1950
M. INGRAM
2,533,462
ELECTRODE ASSEMBLY
Filed May 15, 1946
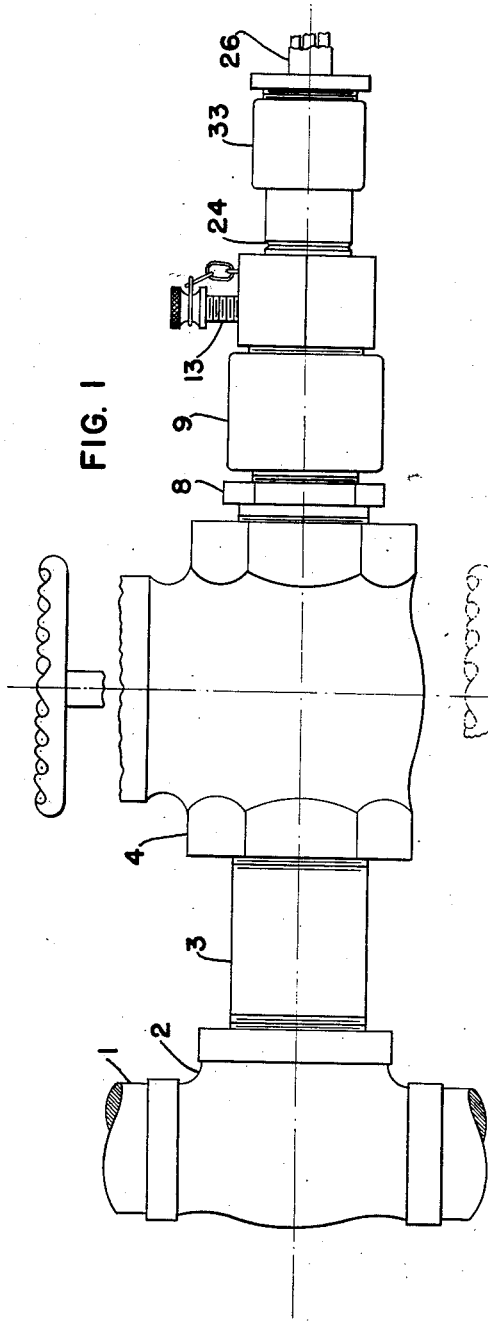
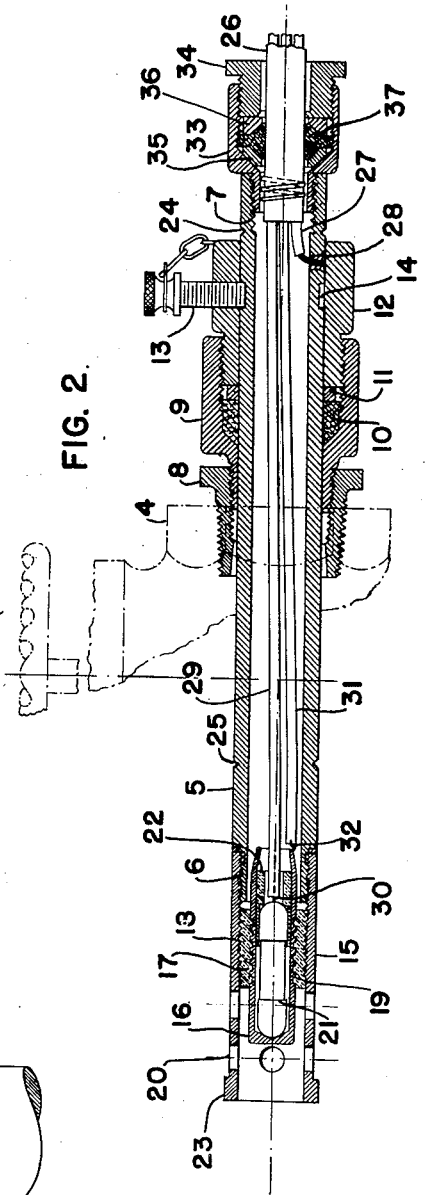
INVENTOR.
MAXWELL INGRAM
BY *William J. Barnes*
ATTORNEY Patented Dec. 12, 1950

2,533,462

UNITED STATES PATENT OFFICE 2,533,462

ELECTRODE ASSEMBLY

Maxwell Ingram, New York, N. Y., assignor to Pilot Marine Corporation, New York, N. Y., a corporation of New Jersey Application May 15, 1946, Serial No. 670,003

11 Claims. (Cl. 175—183)

This invention relates to an electrode assembly to be placed in electrolyte solutions for measuring the conductivity of the solution, or for otherwise providing spaced electrodes between which such a solution may flow. In the embodiment herein described, an assembly is shown which has been found to be especially useful in a salinity indicating system, such as is described and claimed in my co-pending application Serial No. 625,047, filed October 27, 1945. However, it is to be understood that various other embodiments of the assembly may be made and it may be associated with various other types of apparatus.

An object of this invention is to provide an assembly which may be readily inserted into, and withdrawn, as desired, from, a system of pipes, or other conduits, through which the solution under test flows, without interfering with the flow of solution through the system. Another object is to provide means in the assembly to compensate for temperature differences in the solution. Still another object is to provide means for preventing the assembly from backing out of position when subjected to high pressure.

Further objects will be apparent from the following description taken in conjunction with the drawing in which, Fig. 1 is a partial elevation showing the assembly in position, extending through a valve into a piping system through which the solution under test flows, and Fig. 2 is a longitudinal sectional view through the assembly showing its various component parts in section.

Referring to Fig. 1, the numeral 1 represents a pipe through which the solution under test flows. At the location where it is desired to insert an assembly, a T-coupling 2 is inserted and a nipple 3 connects this coupling with a gate valve indicated generally as 4. The assembly structure, to be hereinafter described, extends through this valve and nipple 3 into the coupling 2, projecting into the path of flow of the solution. As shown to the right of the valve 4 in Fig. 1, various parts of the assembly project outside of this valve.

The entire assembly structure may be moved to the right, clear of the valve which may then be shut, thereby permitting withdrawal of the assembly for cleaning, inspection, etc., without interfering with the flow of solution through the pipe 1.

This valve furnishes a convenient arrangement for mounting the electrode assembly and permits its ready removal. However, it is to be understood that the assembly may, if desired, be connected into the piping system without using a shut-off valve such as 4.

Referring to Fig. 2, the numeral 5 indicates a long cylindrical outer sleeve, or casing, screw threaded at both ends, as illustrated at 6 and 7. When the electrodes are in operating position, as shown in this figure, the casing 5 projects through the valve 4, and a bushing 8 threaded into the valve. A collar 9 threaded into the bushing 8 has an enlarged central opening in which packing 10 may be placed to provide a watertight seal for the outer casing 5, which slides through the collar 9. This packing may be held in place by a ring 11, against which the gland nut 12 is forced as it is threaded into the collar 9. This nut preferably has a knurled-headed screw 13 threaded into it so that the end of the screw may engage in an annular recess 14 in the outer casing 5. It will be understood that since the gland nut 12 is secured to the collar 9, which in turn is secured to the bushing 8 held in the valve 4, the screw 13 will prevent the outer sleeve and its associated parts from being forced outwardly through the valve by reason of high pressures in the piping system.

Looking now at the lefthand end of Fig. 2, the outer electrode 15 is threaded on to the end 6 of the casing 5. The inner electrode 16 is preferably centrally disposed inside of the outer electrode 15, and held in spaced relation thereto by means of the insulating member 17 which is molded in the position shown, being held by the threads 18 and a series of interlocking projections and depressions, as indicated at 19. The end of the outer electrode 15 is open as shown in Fig. 2, and also there are a series of holes 20 distributed around this electrode so as to permit easy access of the solution under test into the space between the outer and inner electrodes. This construction permits any air bubbles which may be formed to escape.

The portions of the inner and outer electrodes which come in contact with the solution under test may be gold plated to diminish polarization and corrosion.

A temperature compensating resistor 21, having a negative temperature-resistance characteristic, is preferably located inside the inner electrode 16 so as to be subjected to the same temperatures as are the two electrodes. This resistor may be held in position by means of the insulating member 22 which has a recess adapted to accommodate one end of the resistor, the other end of the resistor being held against the closed end of the inner electrode, by solder or other suitable means, so that it is electrically connected with the inner electrode. This resistance may, and preferably does, have a temperature-resistance characteristic curve which corresponds with the temperature-resistance characteristic curve of a standardized sea salt solution. For example, the resistance may have the same characteristic as a solution containing one grain of sea salt per gallon.

The end of the outer electrode 15 is preferably provided with an enlarged collar 23 forming a stop ring which abuts against the lefthand face of the bushing 8, thereby preventing the outer casing 5 and its associated members from being completely withdrawn either by the pressure of the liquid under test, or by inadvertence, through the shut-off valve 4 when removing the electrodes from their operating position clear of the valve shut-off. When it is desired to remove the electrode assembly entirely from the system, after the inner sleeve has been pulled to the right so that the stop ring 23 contacts the bushing 8, the valve 4 is closed to prevent the escape of the solution under test, and this bushing is unscrewed from the valve and the whole assembly thereby removed.

As shown in Fig. 2, just to the right of the gland nut 12 there is a groove 24 extending around the outer casing 5, which groove may be filled with paint, or other suitable coloring matter. This groove is so located in the outer casing that when it occupies the position shown in Fig. 2, the outer and inner electrodes mounted on the other end of the casing 5 are in operating position in the solution under test, that is, they project into the T-connection 2, shown in Fig. 1.

As also shown in Fig. 2, to the left of the valve centerline, there is another groove 25 in which suitable coloring material may also be placed. When the valve has been pulled to the right so that the groove 25 is just outside of the gland nut 12, in the position in which the groove 24 is shown in Fig. 2, the end of the outer electrode 15 will be clear of the valve shut-off mechanism so that the valve can be closed to prevent the escape of the solution from the system. Thereafter, the entire cell assembly may be removed from the system by unscrewing the bushing 8 from the valve.

The outer and inner electrodes and the temperature compensating resistor 21 are electrically connected to suitable indicating system (not shown) through the medium of a three-wire cable 26 in the following manner. One wire, 27, is soldered, or otherwise fastened, as indicated at 28, to the outer casing 5 with which the outer electrode 15 is in electrical connection at the screw-threaded portion 6. Another wire 29 is soldered, or otherwise connected with the temperature-compensating resistor 21, as indicated at 30, and the third wire 31 is soldered, or otherwise connected with the inner electrode 16, as indicated at 32.

The righthand end of the outer casing 5 is closed and made solution-tight by means of a terminal tube 33 which engages the threads 7 in the end of the casing, and several additional parts. These parts include: a bushing 34 threaded into the terminal tube 33, as shown in Fig. 2; packing rings 35 and 36, and packing 37 which provides a water-tight seal.

Having thus described one embodiment of the invention, it is not to be understood that it is limited to the details of form, or the precise arrangement of parts set forth, for various changes may be made by those skilled in the art without departing from the spirit, or scope, of the invention as defined in the appended claims reading as follows:

1. An electrode assembly adapted to be inserted into a system containing an electrolytic solution comprising, a plurality of spaced electrodes adapted to be inserted into the system so that said solution may flow therebetween, and a temperature-compensating resistor of solid material having the same temperature-resistance characteristic as said solution mounted within one of said electrodes, said resistor having two contact areas to which electrical connections may be made, and one of said areas being electrically connected and in direct heat-transfer relationship with the electrode in which said resistor is mounted.

2. An electrode assembly according to claim 1, said resistor having a temperature-resistance characteristic curve corresponding to that of a standard sea salt solution.

3. An electrode assembly according to claim 1, the electrode in which said resistor is mounted being disposed within another of said electrodes which is perforated to permit flow of said solution.

4. An electrode assembly according to claim 1, wherein said electrodes are mounted on a tubular supporting member, one end of which is adapted to be inserted into said system, electrical leads are extended through the outer end of said supporting member and are connected respectively to said electrodes and the other of said contact areas, and means is provided for preventing leakage of said solution through said outer end.

5. An electrode assembly adapted to be inserted into a system containing an electrolytic solution comprising, an outer tubular electrode having perforations through which said solution may flow, an inner tubular electrode disposed within said outer electrode, and a temperature-compensating resistor of solid material having the same temperature-resistance characteristic as said solution mounted within said inner electrode, said resistor having two contact areas to which electrical connections may be made, and one of said areas being electrically connected and in direct heat-transfer relationship with said inner electrode.

6. An electrode assembly according to claim 5, said resistor having a temperature-resistance characteristic curve corresponding to that of a standard sea salt solution.

7. An electrode assembly according to claim 5, wherein said electrodes are mounted on a tubular supporting member, one end of which is adapted to be inserted into said system, electrical leads are extended through the outer end of said supporting member and are connected respectively to said electrodes and the other of said contact areas, and means is provided for preventing leakage of said solution through said outer end.

8. An electrode assembly adapted to be mounted on the wall of a container for an electrolytic solution comprising, an elongated supporting member, a mounting means adapted to be attached to said wall and having an aperture through which said supporting member may be inserted, a pair of spaced electrodes attached to the inner end of said supporting member, a temperature-compensating resistor of solid material having the same temperature-resistance characteristic as said solution mounted within one of said electrodes, said resistor having two contact areas to which electrical connections may be made, and one of said areas being electrically connected and in direct heat-transfer relationship with the electrode in which said resistor is mounted, and means for locking said supporting member in position in said mounting means.

9. An electrode assembly according to claim 8 wherein said locking means comprises a recess near the outer end of said supporting member and a set screw carried by said mounting means and adapted to engage said recess.

10. An electrode assembly adapted to be mounted on the wall of a container for an electrolytic solution comprising, a tubular supporting member, a mounting bushing adapted to be attached to said wall and having a cylindrical aperture through which said supporting member may be inserted, a perforated tubular electrode of substantially the same diameter as said supporting member mounted on the inner end thereof, a flange on the inner end of said electrode of a diameter greater than that of said aperture, whereby complete withdrawal of said assembly through said aperture is prevented, an insulating bushing mounted in said electrode, a second tubular electrode mounted in said insulating bushing, a temperature-compensating resistor of solid material having the same temperature-resistance characteristic as said solution mounted within said second electrode, said resistor having two contact areas to which electrical connections may be made, and one of said areas being electrically connected and in direct heat-transfer relationship with said second electrode, an annular groove near the outer end of said supporting member, and a set screw secured to said bushing and adapted to extend into said groove when said electrodes are fully inserted in said container.

11. An electrode assembly according to claim 10, said supporting member having index marks for indicating the depth of insertion of said electrodes through said aperture.

MAXWELL INGRAM.

REFERENCES CITED

The following references are of record in the file of this patent:

UNITED STATES PATENTS

| Number | Name | Date |
|---|---|---|
| 1,472,125 | Keeler | Oct. 30, 1923 |
| 1,601,383 | Todd | Sept. 28, 1926 |
| 1,670,640 | Smith | May 22, 1928 |
| 1,807,821 | Behr | June 2, 1931 |
| 2,195,953 | Ceccon | Apr. 2, 1940 |
| 2,251,641 | Stein | Aug. 5, 1941 |
| 2,370,609 | Wilson et al. | Feb. 27, 1945 |
| 2,371,176 | Kirk et al. | Mar. 13, 1945 |
| 2,450,459 | Thomson | Oct. 5, 1948 |

FOREIGN PATENTS

| Number | Country | Date |
|---|---|---|
| 260,366 | Great Britain | Nov. 4, 1926 |